(12) United States Patent
Ide

(10) Patent No.: US 10,162,183 B2
(45) Date of Patent: Dec. 25, 2018

(54) HEAD MOUNTED DISPLAY DEVICE

(71) Applicant: SEIKO EPSON CORPORATION, Tokyo (JP)

(72) Inventor: Mitsutaka Ide, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/696,502

(22) Filed: Sep. 6, 2017

(65) Prior Publication Data

US 2018/0088335 A1 Mar. 29, 2018

(30) Foreign Application Priority Data

Sep. 26, 2016 (JP) ................................. 2016-186601

(51) Int. Cl.
*G02B 27/01* (2006.01)
*G02B 27/00* (2006.01)
*G02B 27/09* (2006.01)
*G02B 26/10* (2006.01)

(52) U.S. Cl.
CPC ....... *G02B 27/0172* (2013.01); *G02B 26/101* (2013.01); *G02B 27/0025* (2013.01); *G02B 27/0977* (2013.01); *G02B 2027/011* (2013.01); *G02B 2027/0145* (2013.01); *G02B 2027/0178* (2013.01)

(58) Field of Classification Search
CPC ............ G02B 27/0025; G02B 27/0172; G02B 27/283; G02B 2027/011; G02B 27/0068
USPC ......................................... 359/637, 630, 631
See application file for complete search history.

(56) References Cited

U.S. PATENT DOCUMENTS

2011/0164294 A1 7/2011 Shimizu
2017/0315360 A1* 11/2017 Takeda .................... G02B 5/32

FOREIGN PATENT DOCUMENTS

| JP | H05-229327 A | 9/1993 |
| JP | 2016-071309 A | 5/2016 |
| JP | 2016-072936 A | 5/2016 |
| WO | 2010-035607 A1 | 4/2010 |
| WO | 2016/051706 A1 | 4/2016 |
| WO | 2016/051747 A1 | 4/2016 |

* cited by examiner

*Primary Examiner* — Mohammed Hasan
(74) *Attorney, Agent, or Firm* — Oliff PLC

(57) ABSTRACT

A head mounted display device includes a scanning section that forms a scan image by scanning a light beam emitted from a light source, a light guiding optical system that guides the light beam emitted from the scanning section, and a deflection member that deflects the light beam guided by the light guiding optical system toward the eye. The light guiding optical system includes an optical correction system in which a first light path length of a light beam from the scanning section to a first end portion on a nose side of the deflection member is longer than a second light path length of a light beam from the scanning section to a second end portion on an ear side of the deflection member, and that corrects scanning distortion in the scan image which cause a virtual image to have different magnifications in a horizontal direction.

7 Claims, 7 Drawing Sheets

HEAD MOUNTED DISPLAY DEVICE

BACKGROUND

1. Technical Field

The present disclosure relates to a head mounted display device.

2. Related Art

A head mounted display device that displays a scan image obtained by scanning a light beam as a virtual image includes a light source, a scanning section, a light guiding optical system, and a deflection member. The light source emits a light beam. The scanning section scans the light beam emitted from the light source in mutually intersecting first and second directions to form a scan image. The light guiding optical system guides the light beam emitted from the scanning section toward the front of an eye of a user. The deflection member deflects the light beam that is guided to in front of the eye by the light guiding optical system toward the eye of the user. The head mounted display device thereby enables the user to see a virtual image (see JP-A-2016-72936 and JP-A-2016-71309). The head mounted display device described in JP-A-2016-72936 includes an optical correction system that is disposed between a beam width expander (pupil/aperture expander) provided in a light guiding optical system and a holographic mirror employed as a deflection member. The optical correction system corrects aberration and distortion arising in an image that are caused by the holographic mirror. The head mounted display device described in JP-A-2016-71309 includes an optical correction system that is disposed between an afocal optical system employed by a light guiding optical system and a light guiding mirror. The optical correction system is formed of two lenses that correct image distortion caused by a scanning section.

In a head mounted display device, due to changing the tilt of a scanning mirror using an actuator to scan a light beam, scanning distortion occurs in a virtual image giving different magnifications in the virtual image horizontal direction. As a result, changes occur in the angle of view and changes occur in the resolution in the virtual image horizontal direction, and image quality is reduced. However, the technology described in JP-A-2016-72936 does not address the scanning distortion described above, and despite being able to correct aberration and distortion in an image caused by the holographic mirror employed as the deflection member, the optical correction system in JP-A-2016-72936 is unable to correct scanning distortion. JP-A-2016-71309 describes image distortion arising from a scanning section, but does not address scanning distortions, and the optical correction system described in JP-A-2016-71309 is unable to correct scanning distortion. Moreover, in a configuration in which a light beam is guided to a deflection member via a light guiding mirror disposed at an angle forward, as in the configuration described in JP-A-2016-71309, there is concern of increased scanning distortion in a virtual image as a result of differences between the light path length from the scanning section to a user's nose side portion of the deflection member and the light path length from the scanning section to a user's ear side portion of the deflection member.

SUMMARY

An advantage of some aspects of the embodiment is providing a head mounted display device capable of suppressing a reduction in image quality caused by scanning distortion when displaying a scan image obtained by scanning a light beam as a virtual image.

According to a first aspect of the embodiment, a head mounted display device includes a light source, a scanning section, a deflection member, and a light guiding optical system. The light source is disposed at the head of a user, and emits a light beam. The scanning section forms an image by scanning the light beam emitted from the light source in a first direction and a second direction intersecting the first direction. The deflection member is disposed in front of an eye of the user and deflects the incident scan image toward the eye of the user. The light guiding optical system is disposed on a light path between the scanning section and the deflection member and guides the scan image projected from the scanning section toward the deflection member. The deflection member includes a first end portion that is an end portion on a side away from the light source and a second end portion that is an end portion on the opposite side to the first end portion. The scanning section is disposed such that the first direction coincides with a direction from the first end portion toward the second end portion of the deflection member. The light guiding optical system includes an optical correction system that makes a first light path length longer than a second light path length, the first light path length being a length of a light path from the scanning section to an edge of the scan image on a first end portion side and the second light path length being a length of a light path from the scanning section to another edge of the scan image on a second end portion side.

In this case, scanning distortion occurs in the scan image formed by the light beam being scanned by the scanning section, as scanning distortion in which a virtual image is magnified with different magnifications in the horizontal direction of the virtual image. However, the optical correction system is provided to the light guiding optical system to make the first light path length of the light beam from the scanning section to the first end portion of the deflection member longer than a second light path length of the light beam from the scanning section to the second end portion of the deflection member. Thus, in the optical correction system a magnification can be obtained in which the magnification at the first end portion of the deflection member is a higher magnification than the magnification at the second end portion of the deflection member. Thus, by aligning the direction of magnification with the scanning distortion direction, the effect of scanning distortion can be suppressed. This enables differences in resolution and the like in the first direction of the virtual image to be attenuated, enabling a reduction in the image quality caused by scanning distortion to be suppressed.

In the head mounted display device, the optical correction system may include a lens system that projects the scan image projected from the scanning section at an angle forward and away from the head, and a light guiding mirror that reflects the scan image projected from the lens system toward the deflection member. In this case, the first light path length of the light beam from the scanning section to the user's nose side of the deflection member can be made longer than the second light path length of the light beam from the scanning section to the user's ear side of the deflection member.

In the head mounted display device, a direction in which the scan image is projected from the scanning section may be toward a position on the opposite side to the head with respect to a direction in which the light beam is incident on the scanning section. This generates scanning distortion in the scan image in which the magnification at a nose-side portion of the deflection member is higher than the magnification at an ear side portion of the deflection member, enabling the effect of scanning distortion in the horizontal direction of the virtual image to be suppressed by the magnification of the optical correction system.

In the head mounted display device, the light guiding optical system may include a beam width expander including a first reflection face and a second reflection face that face each other along the first direction, and light-transmissive layers and partially reflective layers alternately stacked along the first direction and disposed between the first reflection face and the second reflection face. The beam width expander may have a parallelogram profile in cross-section as viewed along the second direction, having inclined faces respectively configured by an incident face provided at an end portion at one side in a third direction intersecting the first direction and the second direction and an emission face provided at an end portion at the other side in the third direction.

In the head mounted display device, the light guiding optical system may include a beam width expander including a first reflection face and a second reflection face that face each other along the first direction, and light-transmissive layers and partially reflective layers alternately stacked along the first direction and disposed between the first reflection face and the second reflection face. The beam width expander may have a trapezoid profile in cross-section as viewed along the second direction, having inclined faces respectively configured by an incident face provided at an end portion at one side in a third direction intersecting the first direction and the second direction and an emission face provided at an end portion at the other side in the third direction. A direction in which the scan image is projected from the scanning section may be toward a position on the head side with respect to a direction in which the light beam is incident on the scanning section. In this case, scanning distortion is generated in the scan image in which magnification at a nose-side portion of the deflection member is higher than magnification at an ear side portion of the deflection member. However, the magnification at the nose-side portion of the deflection member is higher than the magnification at the ear side portion of the deflection member after the scan image has passed through the beam width expander. The effect of scanning distortion in the horizontal direction of the virtual image can accordingly be suppressed as a result of correction by the magnification of the optical correction system.

In the head mounted display device, the scanning section may also include a scanning mirror and an actuator to drive the scanning mirror in at least the first direction, and an angle of incidence of the light beam with respect to the scanning mirror may be 10° or greater.

In the head mounted display device, the first direction may be a horizontal direction the two eyes of the user are lined up along.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Figure 1:
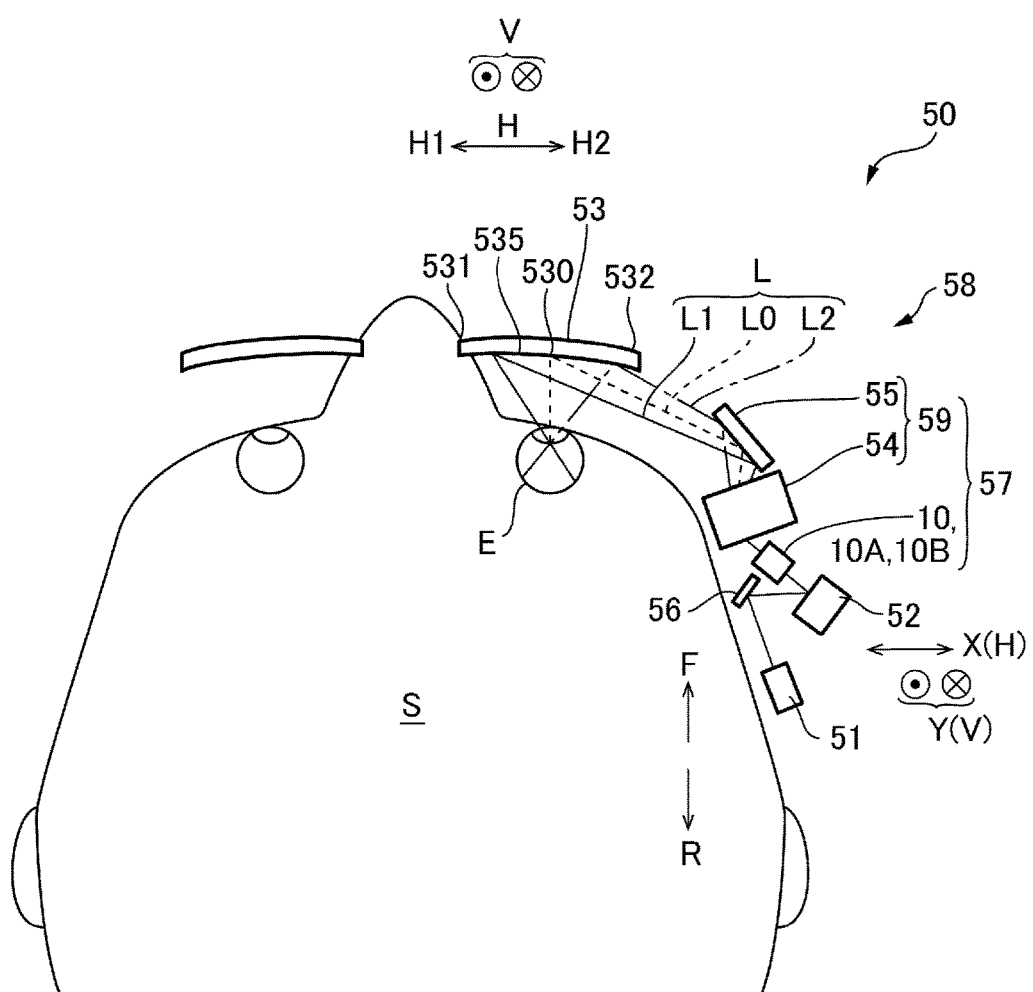
FIG. 1 is an explanatory diagram illustrating an optical system of a head mounted display device according to a first embodiment.

Explanation follows regarding embodiments. Note that in the drawings referenced in the following explanation, each layer and each member has been enlarged enough to be seen on the drawing page, and the number and scaling of each layer and each member is different.

First Embodiment

Example of Head Mounted Display Device Configuration

Figure 2:
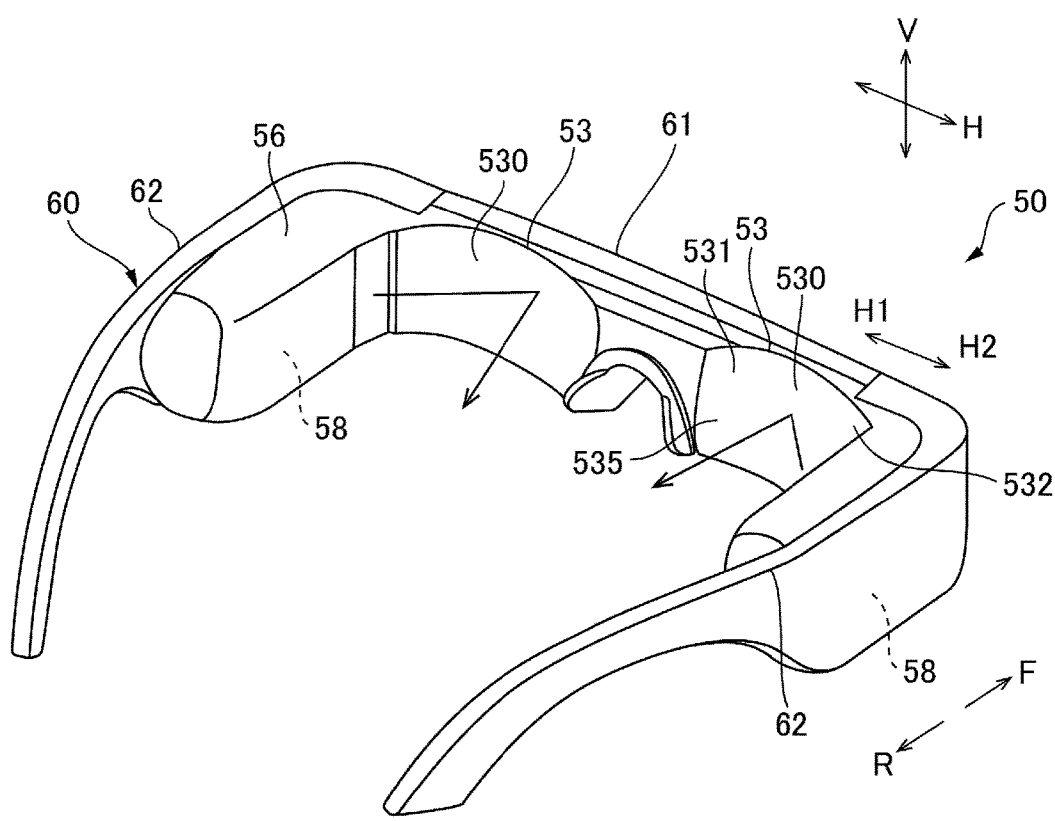
FIG. 2 is an explanatory diagram illustrating the exterior of the head mounted display device illustrated in FIG. 1.

FIG. 1 is an explanatory diagram illustrating an optical system of a head mounted display device 50 according to a first embodiment. FIG. 2 is an explanatory diagram illustrating the exterior of the head mounted display device 50 illustrated in FIG. 1. The head mounted display device 50 illustrated in FIG. 1 includes a light source 51 and a scanning section 52. The light source 51 emits a light beam L at the side of a head S of a user. The scanning section 52 forms scan images by scanning, at the side of the head S, the light beam L emitted from the light source 51, by scanning in a first direction X and in a second direction Y intersecting the first direction X. The head mounted display device 50 also includes a light guiding optical system 57 that guides the light beam L emitted from the scanning section 52, by guiding from the side of the head S to the front of an eye E, and a deflection member 53 disposed in front of the eye E. The deflection member 53 deflects the light beam L guided by the light guiding optical system 57 toward the eye E, causing the user to see a virtual image.

The light guiding optical system 57 includes a lens system 54, such as a relay lens system or a projection lens system, and a light guiding mirror 55 that reflects the light beam emitted from the lens system 54 toward the deflection member 53. A beam width expander 10 is disposed in the light guiding optical system 57 between the scanning section 52 and the lens system 54. A first beam width expander 10A that expands the beam width of the light beam L emitted from the light source 51 by expanding in the first direction X, and a second beam width expander 10B that expands the beam width of the light beam L expanded in beam width by the first beam width expander 10A by expanding in the second direction Y, are disposed as the beam width expander 10.

The light source 51 includes, for example, a red laser element that emits red light, a green laser element that emits green light, and a blue laser element that emits blue light. The light source 51 also includes a half mirror or the like to combine the light paths of these laser elements. Under control of a controller (not illustrated in the drawings), the red laser element, the green laser element, and the blue laser element emit modulated light beams at a light intensity corresponding to each dot on an image to be displayed.

The scanning section 52 scans the incident light beam L in the first direction X corresponding to a horizontal direction of a virtual image, and in the second direction Y corresponding to a vertical direction V of the virtual image. The scanned light is projected onto the deflection member 53 via the light guiding optical system 57 or the like. The scanning section 52 may be realized by a micro mirror device formed by utilizing micro electro mechanical systems (MEMS) employing, for example, a silicon substrate. In such cases, the scanning section 52 may employ a configuration that uses a single scanning mechanism to scan incident light in the two directions corresponding to the horizontal direction and the vertical direction of the image. The scanning section 52 may also be configured by a first scanning mechanism to scan incident light in one direction out of the two directions corresponding to the first direction X and the second direction Y, and a second scanning mechanism to scan incident light in the other of the two directions corresponding to the first direction X and the second direction Y. Such a scanning section 52 scans incident light in a predetermined direction under control of a controller (not illustrated in the drawings).

The deflection member 53 includes a deflection layer 535 that reflects light projected from the light guiding optical system 57 and makes the reflected light incident on the eye E of a user. In such a head mounted display device 50 (retinal scanning projection-type display device), the light beam L that was scanned in the first direction X and the second direction Y by the scanning section 52 is deflected by the deflection layer 535 of the deflection member 53 and reaches the retina via the pupil, causing the user the see a virtual image. In the present embodiment, the beam width of the light beam L is expanded by the beam width expander 10 (the first beam width expander 10A and the second beam width expander 10B), causing a user to see a virtual image as long as the eye E is positioned within the range of the expanded beam width.

In the present embodiment, the deflection member 53 is a partially transmissive combiner configured from a holographic element or the like. Thus, due to external light also being incident on the eye via the deflection member 53 (the combiner), an image in which the image formed by the head mounted display device 50 and external light (the background) are overlaid can be made visible to the user. Namely, the head mounted display device 50 is configured as a see-through retinal scanning type of projection device.

When the head mounted display device 50 configured in this manner configures a see-through eyeglass display, the head mounted display device 50 is formed in a shape like that of glasses, as illustrated in FIG. 2. In order to make modulated light to be incident onto each of the left and right eyes E of a user, the head mounted display device 50 includes a frame 60 to support the deflection member 53 for the left eye and the deflection member 53 for the right eye at a front section 61, and optical units 58 including the optical components described with reference to FIG. 1 are provided at each of left and right temples 62 of the frame 60. In this case, the light source 51, the scanning section 52, and the light guiding optical system 57 may all be provided to the optical units 58. Alternatively, configuration may be made such that just the scanning section 52 and the light guiding optical system 57 are provided to the optical units 58, and the optical units 58 and the light source 51 are connected together by an optical cable or the like.

Peripheral Configuration to Beam Width Expander 10A

Figure 3:
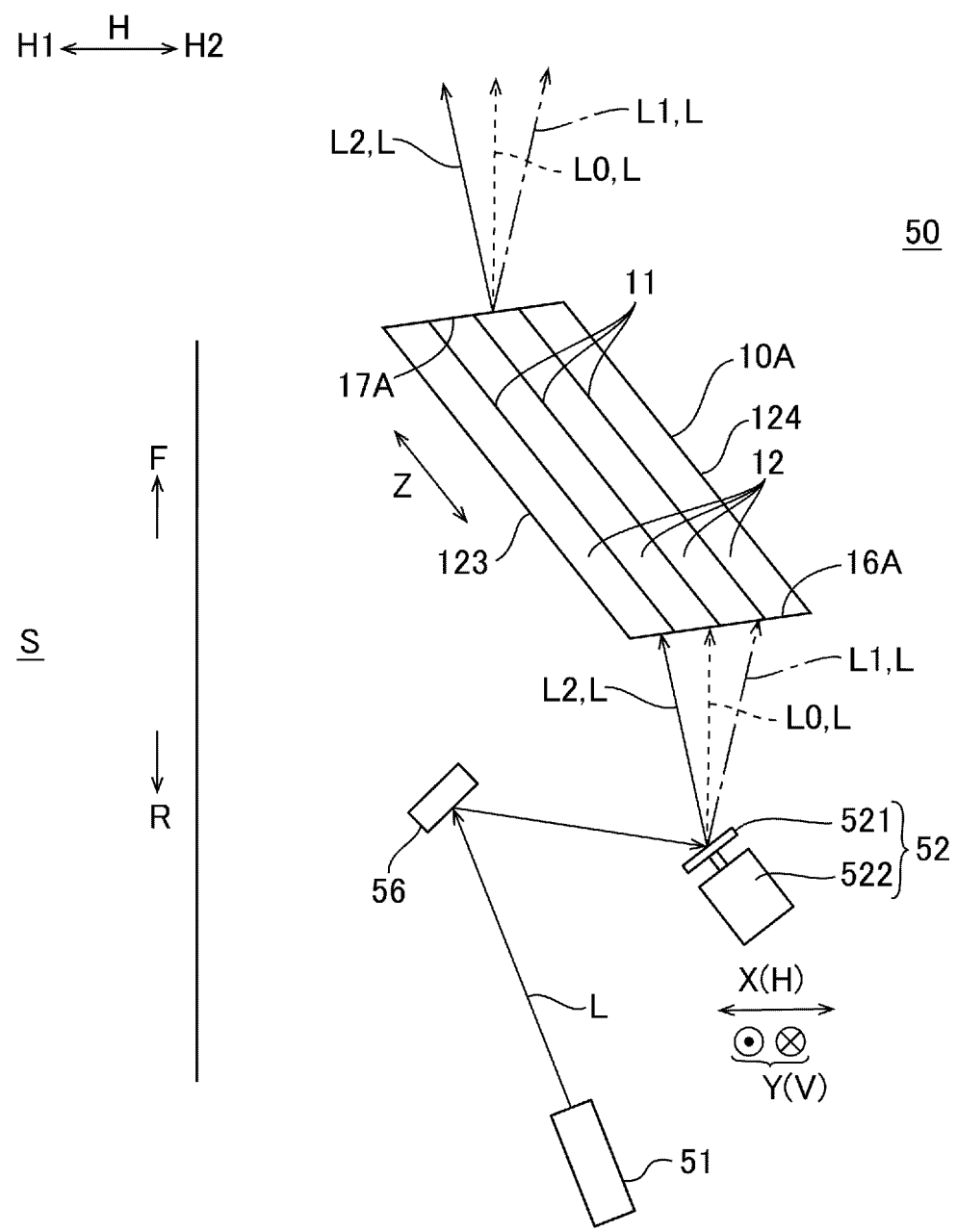
FIG. 3 is an explanatory diagram schematically illustrating the scanning section, the first beam width expander, and the like illustrated in FIG. 1.

FIG. 3 is an explanatory diagram schematically illustrating the scanning section 52, the first beam width expander 10A, and the like illustrated in FIG. 1. Note that although the number of layers of light-transmissive layers 12 in the first beam width expander 10A is illustrated as four layers in FIG. 3, in reality there are, for example, about ten stacked layers of the light-transmissive layers 12.

As illustrated in FIG. 3, the scanning section 52 of the head mounted display device 50 of the present embodiment includes a scanning mirror 521 and an actuator 522 that drives the scanning mirror 521. The scanning section 52 is disposed such that the scanning mirror 521 faces toward a front F of the head S. In order to make the light beam L emitted from the light source 51 incident on the scanning mirror 521 of the scanning section 52 configured in such a manner, in the present embodiment, the light source 51 is disposed facing toward the front F at the side of the head S and a mirror 56 is disposed further to the front F than the light source 51. Moreover, the scanning section 52 is disposed at a position further away from the head S than the light source 51 and the mirror 56 and further toward a rear R than the mirror 56. The light beam L emitted from the light source 51 is thereby reflected by the mirror 56 toward a direction away from the head S so as to be made incident on the scanning mirror 521. Thus, the emission direction of the light beam L from the scanning section 52 is toward a position on the opposite side to the head S with respect to the incident direction of the light beam L on the scanning mirror 521. FIG. 3 illustrates a way in which the light beam L is scanned in the first direction X by tilting the scanning mirror 521 so as to be emitted as light beams L1, L0, L2. The angle of incidence of the light beam L with respect to the scanning mirror 521 is 10° or greater when these light beams L1, L0, L2 are being emitted.

In the present embodiment, the first direction X corresponds to a horizontal direction H of a virtual image, and the scanning angle by the scanning section 52 in the first direction X defines the angle of view of the virtual image in the horizontal direction H. Namely, the scanning section 52 is disposed such that the first direction X is the same direction as a direction from a first end portion 531 on a nose side of the deflection member 53 toward a second end portion 532 on an ear side of the deflection member 53. Note that although not illustrated in the drawings, the second direction Y intersecting the first direction X corresponds to the vertical direction V of a virtual image, and the scanning angle by the scanning section 52 in the second direction Y defines the angle of view of the virtual image in the vertical direction V.

The first beam width expander 10A is disposed in front of the scanning section 52. In the first beam width expander 10A, the light-transmissive layers 12 and partially reflective layers 11 are alternately stacked in the first direction X and disposed between a first reflection face 123 and a second reflection face 124 that face each other along the first direction X. An incident face 16A and an emission face 17A are respectively provided at an end portion at one side and an end portion at the other side of the first beam width expander 10A in a third direction Z (length direction) intersecting the first direction X and the second direction Y. In the present embodiment, the first beam width expander 10A has a parallelogram profile in cross-section with the incident face 16A and the emission face 17A configured as the inclined faces. The number of times light is internally reflected in such a first beam width expander 10A is an even number, and so the scan image is output without scanning distortion, described later, reversing.

The light-transmissive layers 12 are configured by substrates, such as glass substrates or quartz substrates, and by light-transmissive adhesive layers (not illustrated in the drawings). The first reflection face 123 and the second reflection face 124 are configured by an interface where a vacuum-deposited reflective metal film, such as of aluminum, contacts the light-transmissive layers 12. Note that the first reflection face 123 and the second reflection face 124 may be reflection faces employing differences in refractive index according to Snell's law. The partially reflective layers 11 are configured from dielectric multilayer films of alternately stacked dielectric films of low dielectric constant and dielectric films of high dielectric constant, selected from inorganic films, such as silicon dioxide ($SiO_2$), titanium dioxide ($TiO_2$), alumina ($Al_2O_3$), calcium fluoride ($CaF_2$), magnesium fluoride ($MgF_2$), zinc sulfide (ZnS), and zirconium dioxide ($ZrO_2$). In the present embodiment, the partially reflective layers 11 are configured by dielectric multilayer films formed by alternately stacking $SiO_2$ and $TiO_2$ using vacuum deposition.

In the first beam width expander 10A configured as described above, when the light beam L is incident in a parallel light beam state on the incident face 16A, the light beam L propagates in the third direction Z while being repeatedly reflected by a first reflection layer 13, reflected by the second reflection layer 14, transmitted by the partially reflective layers 11, and reflected by the partially reflective layers 11. The light beam is then emitted from the emission face 17A in a state remaining as a parallel beam and having a beam width expanded in the first direction X. The light beam L having its beam width expanded in the first direction X by the first beam width expander 10A is incident on the second beam width expander 10B (not illustrated in FIG. 3). The second beam width expander 10B is a beam width expander with the same configuration as that of the first beam width expander 10A but disposed with a changed orientation thereto, and so although illustration and detailed explanation thereof is omitted from FIG. 3, the second beam width expander 10B expands the beam width of the incident light beam L in the second direction Y corresponding to the vertical direction V of a virtual image.

Correcting of Scanning Distortion

Figure 4:
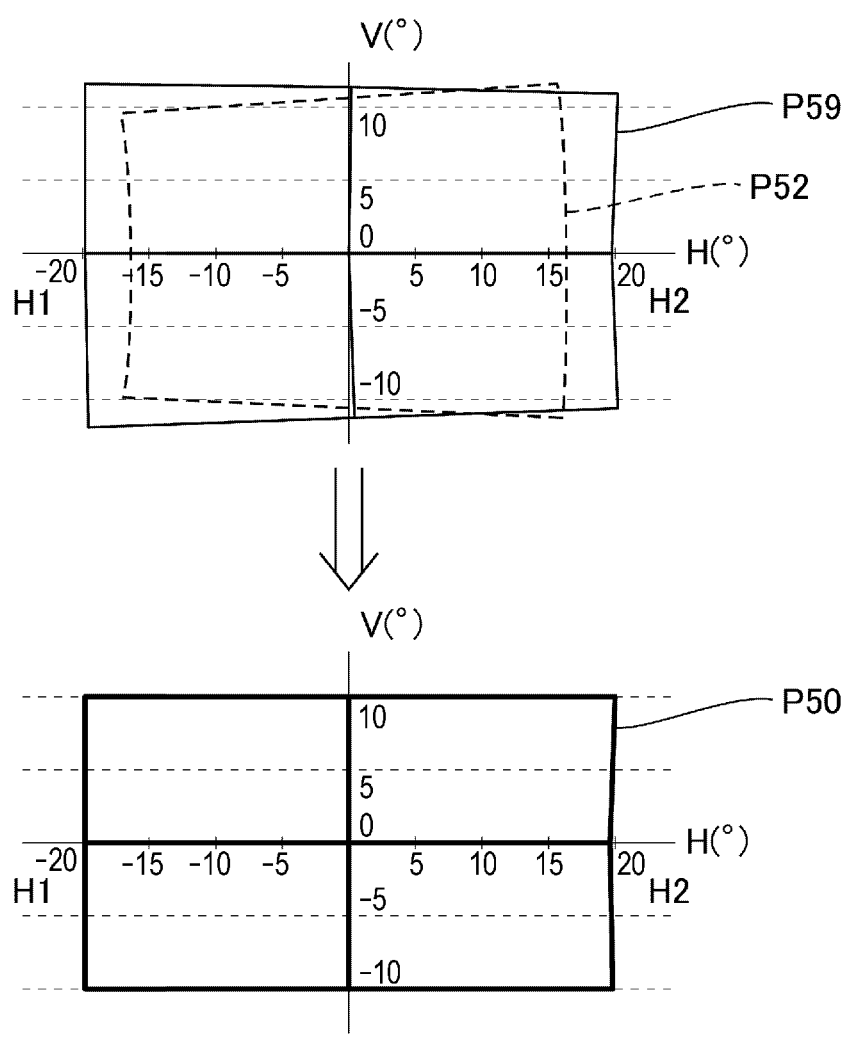
FIG. 4 is an explanatory diagram illustrating a way of correcting scanning distortion in the head mounted display device illustrated in FIG. 1.

FIG. 4 is an explanatory diagram illustrating a way of correcting scanning distortion in the head mounted display device 50 illustrated in FIG. 1. The top of FIG. 4 illustrates scanning distortion and the like prior to correction, and the bottom of FIG. 4 illustrates distortion after correction. The horizontal axis in FIG. 4 is the angle of view (°) in the horizontal direction H, and the vertical axis in FIG. 4 is the angle of view (°) in the vertical direction V.

FIG. 3 illustrates the result from scanning by the scanning section 52, in which light beam L incident to and emitted from the incident face 16A at an angle is light beam L1, light beam L incident to and emitted from the incident face 16A perpendicularly is light beam L2, and light beam L between the light beam L1 and the light beam L2 is light beam L0. Note that light beam L1 reaches the first end portion 531 on the side of the deflection member 53 illustrated in FIG. 1 closest to the nose (the end portion on the side away from the light source 51), light beam L2 reaches the second end portion 532 on the side of the deflection member 53 illustrated in FIG. 1 closest to the ear (the end portion on the opposite side to the first end portion 531), and light beam L0 reaches a central portion 530 of the deflection member 53 illustrated in FIG. 1.

When this occurs, scanning distortion occurs in the scan image formed by scanning the light beam L using the scanning section 52. In the scanning distortion, the magnification at a nose side H1 is decreased and magnification at an ear side H2 is increased in the horizontal direction H of the virtual image, as illustrated by the dashed line P52 in the explanatory diagram of distortion prior to correction illustrated at the top of FIG. 4. In the present embodiment, an optical correction system 59 is provided to the light guiding optical system 57 explained referencing FIG. 1 to correct the scanning distortion illustrated in FIG. 4.

The optical correction system 59 of the present embodiment is an optical system that has a longer first light path length of the light beam L1 from the scanning section 52 to the first end portion 531 on the nose side of the deflection member 53 than a second light path length of the light beam L2 from the scanning section 52 to the second end portion 532 on the ear side of the deflection member 53. The optical correction system 59 of the present embodiment is configured by the lens system 54 that emits the light beam L emitted from the scanning section 52 at an angle forward and away from the head S, and the light guiding mirror 55 that reflects the light beam L emitted from the lens system 54 toward the deflection member 53.

Such an optical correction system 59 magnifies with a higher magnification at the nose side H1 and a lower magnification at the ear side H2 in the horizontal direction H of a virtual image, as illustrated by the solid line P59 in the explanatory diagram of distortion prior to correction illustrated at the top of FIG. 4. Accordingly, as a result of the scanning distortion illustrated by the dashed line P52 being corrected by the magnification by the optical correction system 59 illustrated by the solid line P59, a virtual image in which distortion has been suppressed in the horizontal direction H is seen by the user, as illustrated by the solid line P50 of distortion after correction at the top of FIG. 4.

Principal Advantageous Effects of the Present Embodiment

As explained above, in the head mounted display device 50 of the present embodiment, scanning distortion occurs in the scan image of light beam L scanned by the scanning section 52 giving different magnifications to a virtual image in the horizontal direction H of the virtual image. However, the optical correction system 59 is provided to the light guiding optical system 57. In the optical correction system 59, the first light path length of the light beam L1 from the scanning section 52 to the first end portion 531 on the nose side of the deflection member 53 is longer than the second light path length of the light beam L2 from the scanning section 52 to the second end portion 532 on the ear side of the deflection member 53. Thus, a magnification can be obtained in the optical correction system 59 in which the magnification at the first end portion 531 on the nose side of the deflection member 53 is a higher magnification than the magnification at the second end portion 532 on the ear side. Thus, by aligning the direction of magnification with the scanning distortion direction, the effect of scanning distortion in the horizontal direction H of a virtual image can be suppressed. This enables differences in angle of view or differences in resolution in the horizontal direction H of the virtual image to be attenuated, enabling a reduction in the image quality caused by scanning distortion to be suppressed.

Second Embodiment

Figure 5:
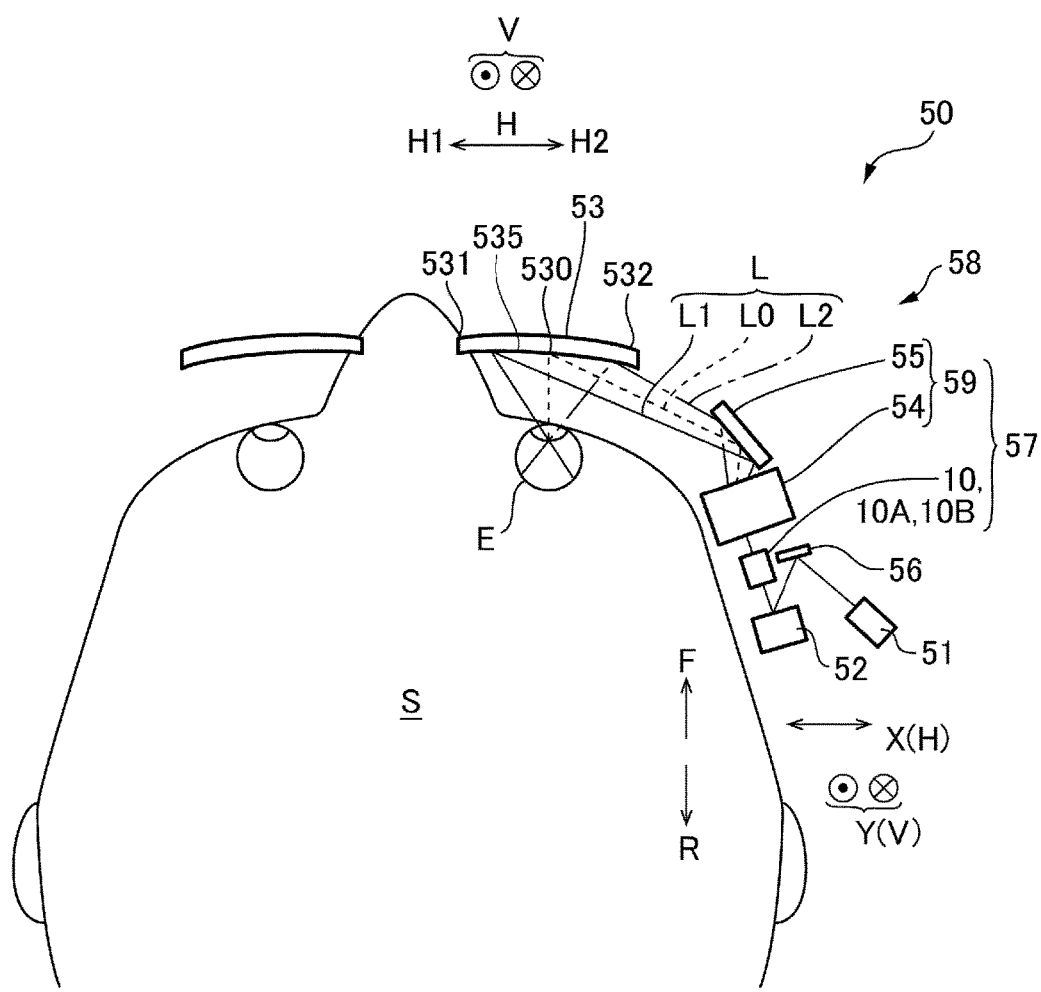
FIG. 5 is an explanatory diagram illustrating an optical system of a head mounted display device according to a second embodiment.
Figure 6:
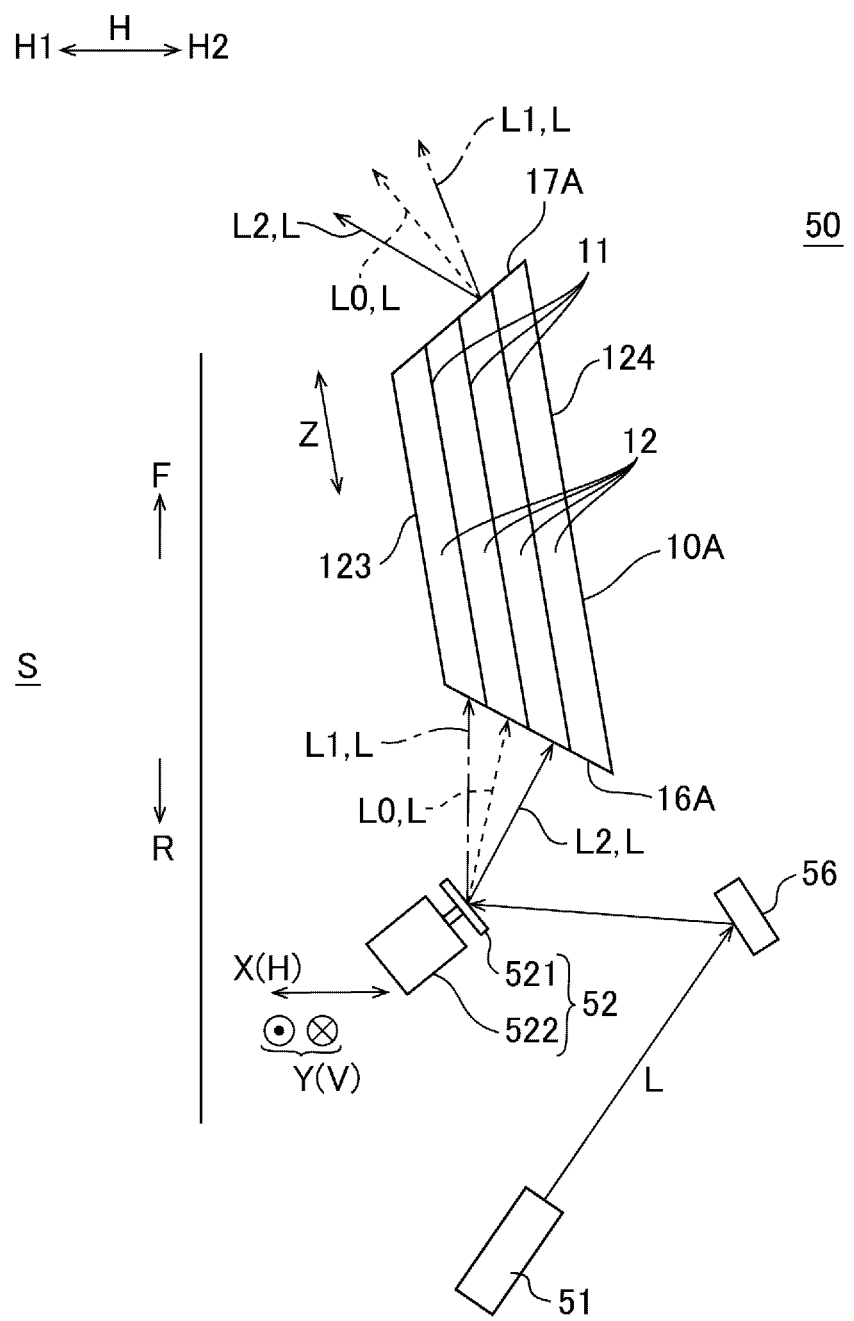
FIG. 6 is an explanatory diagram schematically illustrating the scanning section, the first beam width expander, and the like illustrated in FIG. 5.
Figure 7:
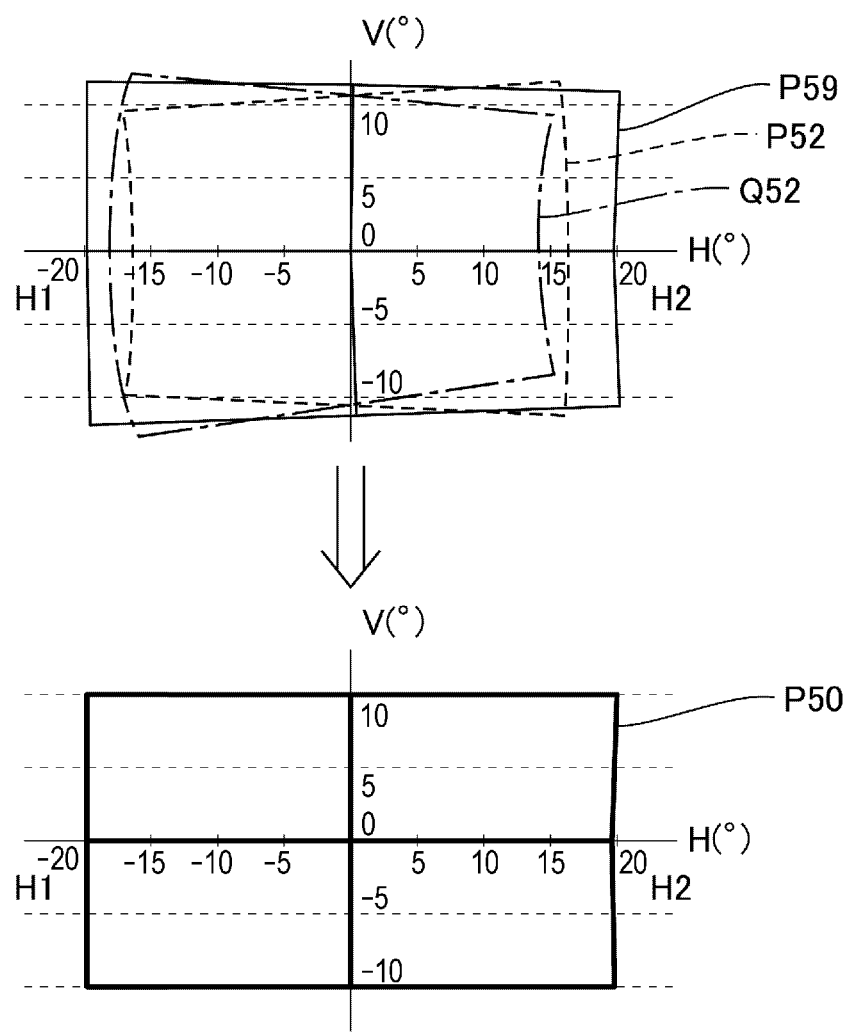
FIG. 7 is an explanatory diagram illustrating a way of correcting scanning distortion in the head mounted display device illustrated in FIG. 5.

FIG. 5 is an explanatory diagram illustrating an optical system of a head mounted display device 50 according to a second embodiment. FIG. 6 is an explanatory diagram schematically illustrating the scanning section 52, the first beam width expander 10A, and the like illustrated in FIG. 5. Although the number of layers of light-transmissive layers 12 in the first beam width expander 10A is illustrated as four layers in FIG. 6, in reality there are, for example, about ten stacked layers of the light-transmissive layers 12. FIG. 7 is an explanatory diagram illustrating a way of correcting scanning distortion in the head mounted display device 50 illustrated in FIG. 5. The top of FIG. 7 illustrates scanning distortion and the like prior to correction, and the top of FIG. 7 illustrates distortion after correction. The horizontal axis in FIG. 7 is the angle of view (°) in the horizontal direction H, and the vertical axis in FIG. 7 is the angle of view (°) in the vertical direction V. Note that due to the basic configuration of the present embodiment being similar to that of the first embodiment, the same reference signs are appended to common portions, and explanation thereof is omitted.

Similarly to in the first embodiment, the head mounted display device 50 illustrated in FIG. 5 also includes a light source 51 that emits a light beam L at the side of a head S of a user, and a scanning section 52 that scans images by scanning the light beam L emitted from the light source 51, by scanning in a first direction X and in a second direction Y intersecting the first direction X at the side of the head S. The head mounted display device 50 also includes a light guiding optical system 57 that guides the light beam L emitted from the scanning section 52 by guiding from the side of the head S to the front of an eye E, and a deflection member 53 disposed in front of the eye E. The deflection member 53 deflects the light beam L guided by the light guiding optical system 57 toward the eye E, causing the user to see a virtual image.

The light guiding optical system 57 includes a lens system 54 such as a relay lens system or a projection lens system, and a light guiding mirror 55 that reflects the light beam emitted from the lens system 54 toward the deflection member 53. In the light guiding optical system 57, a beam width expander 10 is disposed between the scanning section 52 and the lens system 54. A first beam width expander 10A that expands the beam width of the light beam L emitted from the light source 51 by expanding in the first direction X, and a second beam width expander 10B that expands the beam width of the light beam L expanded in beam width by the first beam width expander 10A by expanding in the second direction Y, are disposed as the beam width expander 10.

As illustrated in FIG. 6, in the head mounted display device 50 of the present embodiment, in order to make the light beam L emitted from the light source 51 incident on the scanning mirror 521 of the scanning section 52, the light source 51 is disposed facing toward the front F at the side of the head S and a mirror 56 is disposed further to the front F than the light source 51. In contrast to in the first embodiment, in the present embodiment, the scanning section 52 is disposed further toward a rear R than the mirror 56, at a position closer to the head S than the light source 51 and the mirror 56. Thus, the emission direction of the light beam L from the scanning section 52 is toward a position to the head S side with respect to the incident direction of the light beam L on the scanning mirror 521. Thus, in a scan image formed by scanning the light beam L using the scanning section 52, scanning distortion occurs in which magnification is higher at a nose side H1 of the virtual image and magnification is lower at an ear side H2 in the horizontal direction H of the virtual image, as illustrated by the single dotted broken line Q52 in the explanatory diagram of distortion prior to correction illustrated at the top of FIG. 7.

Note that the first beam width expander 10A has a trapezoid profile in cross-section having inclined faces configured by an incident face 16A and an emission face 17A configured. The number of times light is internally reflected in the first beam width expander 10A is accordingly an odd number, and so scanning distortion reverses. Thus, as illustrated by the dashed line P52 in the explanatory diagram illustrating distortion prior to correction at the top of FIG. 7, scanning distortion after passing through the first beam width expander 10A has a lower magnification at the nose side H1 and a higher magnification at the ear side H2 in the horizontal direction H of the virtual image.

Moreover, similarly to the first embodiment, in the present embodiment, an optical correction system 59 is also provided in the light guiding optical system 57 illustrated in FIG. 5. The optical correction system 59 is configured including the lens system 54 that emits the light beam L emitted from the scanning section 52 by emitting at an angle forward and away from the head S, and including the light guiding mirror 55 that reflects the light beam L emitted from the lens system 54 toward the deflection member 53. Similarly to the first embodiment, in the present embodiment, the optical correction system 59 is also an optical system in which a first light path length of the light beam L1 from the scanning section 52 to the first end portion 531 on the nose side of the deflection member 53 is longer than a second light path length of the light beam L2 from the scanning section 52 to the second end portion 532 on the ear side of the deflection member 53. Thus, as illustrated by the solid line P59 in the explanatory diagram of distortion prior to correction at the top of FIG. 7, such an optical correction system 59 magnifies with a higher magnification at the nose side H1 and a lower magnification at the ear side H2 in the horizontal direction H of a virtual image. Accordingly, the scanning distortion illustrated by the dashed line P52 is corrected by the magnification of the optical correction system 59 illustrated by the solid line P59, resulting in a virtual image seen by the user in which distortion has been suppressed in the horizontal direction H, as illustrated by the solid line P50 of distortion after correction at the bottom of FIG. 7.

Other Display Devices

In the embodiments described above, light after modulation emitted from the light source 51 is scanned by the scanning section 52. However, a configuration may be adopted in which light prior to modulation emitted from the light source 51 is illuminated onto a liquid crystal panel while being scanned by the scanning section 52, and modulated light emitted from the liquid crystal panel is then reflected by the deflection member 53.

The entire disclosure of Japanese Patent Application No. 2016-186601, filed Sep. 26, 2016 is expressly incorporated by reference herein.

What is claimed is:

1. A head mounted display device, comprising:
    a light source that is disposed at the head of a user and emits a light beam;
    a scanning section that forms an image by scanning the light beam emitted from the light source in a first direction and a second direction intersecting the first direction;
    a deflection member that is disposed in front of an eye of the user and deflects the incident scan image toward the eye of the user; and a light guiding optical system that is disposed on a light path between the scanning section and the deflection member and guides the scan image projected from the scanning section toward the deflection member, wherein the deflection member includes a first end portion that is an end portion on a side away from the light source and a second end portion that is an end portion on the opposite side to the first end portion;

the scanning section is disposed such that the first direction coincides with a direction from the first end portion toward the second end portion of the deflection member; and the light guiding optical system includes an optical correction system that makes a first light path length longer than a second light path length, the first light path length being a length of a light path from the scanning section to an edge of the scan image on a first end portion side and the second light path length being a length of a light path from the scanning section to another edge of the scan image on a second end portion side.

2. The head mounted display device according to claim 1, wherein the optical correction system includes a lens system that projects the scan image projected from the scanning section at an angle forward and away from the head; and a light guiding mirror that reflects the scan image projected from the lens system toward the deflection member.

3. The head mounted display device according to claim 1, wherein a direction in which the scan image is projected from the scanning section is toward a position on the opposite side to the head with respect to a direction in which the light beam is incident on the scanning section.

4. The head mounted display device according to claim 3, wherein the light guiding optical system includes a beam width expander including a first reflection face and a second reflection face that face each other along the first direction, and light-transmissive layers and partially reflective layers alternately stacked along the first direction and disposed between the first reflection face and the second reflection face; and the beam width expander has a parallelogram profile in cross-section as viewed along the second direction, having inclined faces respectively configured by an incident face provided at an end portion at one side in a third direction intersecting the first direction and the second direction and an emission face provided at an end portion at the other side in the third direction.

5. The head mounted display device according to claim 1, wherein the light guiding optical system includes a beam width expander including a first reflection face and a second reflection face that face each other along the first direction, and light-transmissive layers and partially reflective layers alternately stacked along the first direction and disposed between the first reflection face and the second reflection face;

the beam width expander has a trapezoid profile in cross-section as viewed along the second direction, having inclined faces respectively configured by an incident face provided at an end portion at one side in a third direction intersecting the first direction and the second direction and an emission face provided at an end portion at the other side in the third direction; and a direction in which the scan image is projected from the scanning section is toward a position on the head side with respect to a direction in which the light beam is incident on the scanning section.

6. The head mounted display device according to claim 1, wherein the scanning section includes a scanning mirror and an actuator to drive the scanning mirror in at least the first direction; and an angle of incidence of the light beam with respect to the scanning mirror is 10° or greater.

7. The head mounted display device according to claim 1, wherein the first direction is a horizontal direction the two eyes of the user are lined up along.

* * * * *